United States Patent [19]

Kleinsasser

[11] Patent Number: 5,092,271
[45] Date of Patent: Mar. 3, 1992

[54] HEATING PAD

[75] Inventor: Jonathan Kleinsasser, Manitoba, Canada

[73] Assignee: Crystal Spring Colony Farms Ltd., Manitoba, Canada

[21] Appl. No.: 588,377

[22] Filed: Sep. 26, 1990

[30] Foreign Application Priority Data

Sep. 29, 1989 [CA] Canada .................. 614677

[51] Int. Cl.$^5$ .............................. A01K 1/02
[52] U.S. Cl. ......................... 119/20; 5/421
[58] Field of Search ............... 119/20, 28, 16, 28.5; 54/65, 66, 79; 5/421, 422

[56] References Cited

U.S. PATENT DOCUMENTS

| | | | |
|---|---|---|---|
| 800,967 | 10/1905 | Young et al. | 5/422 |
| 1,121,277 | 12/1914 | Mitchell | 5/421 X |
| 2,478,620 | 9/1949 | Arnold | 119/20 |
| 3,028,097 | 4/1962 | Johnson | 119/20 |
| 3,041,441 | 6/1962 | Elbert et al. | 119/28 |
| 3,299,253 | 1/1967 | Lawson, Jr. | 119/16 |
| 3,809,014 | 5/1974 | Jones et al. | 119/28 |
| 4,018,271 | 4/1977 | Jones et al. | 165/175 |
| 4,114,620 | 9/1978 | Moore et al. | 5/421 X |
| 4,132,262 | 1/1979 | Wibell | 5/421 X |
| 4,149,541 | 4/1979 | Gammons et al. | 5/421 X |
| 4,217,859 | 8/1980 | Herring | 119/20 |
| 4,252,082 | 2/1981 | Herring | 119/20 |
| 4,294,195 | 10/1981 | Rodenberg | 119/20 |
| 4,348,986 | 9/1982 | Marrs | 119/20 |
| 4,646,815 | 3/1987 | Iwata | 165/56 |
| 4,979,375 | 12/1990 | Nathans et al. | 5/422 X |

FOREIGN PATENT DOCUMENTS

3403930 8/1985 Fed. Rep. of Germany ........ 119/20

*Primary Examiner*—Gene Mancene
*Assistant Examiner*—Thomas Price
*Attorney, Agent, or Firm*—Adrian D. Battison; Stanley G. Ade; Murray E. Thrift

[57] ABSTRACT

A heating pad for example for animals particularly piglets in a farrowing crate comprises two vacuum formed sheets which lie parallel one on top of the other with a shallow compartment therebetween. A pipe where heating fluid passes into the compartment through the lower sheet and wraps around a number of projections in the lower sheet which extend from the lower sheet up to the under surface of the upper sheet. The pipe is of a flexible elastomeric type resistant to corrosion so that the pad is thus heated by a warm liquid such as water which provides a very simple economic device resistant to damage.

6 Claims, 2 Drawing Sheets

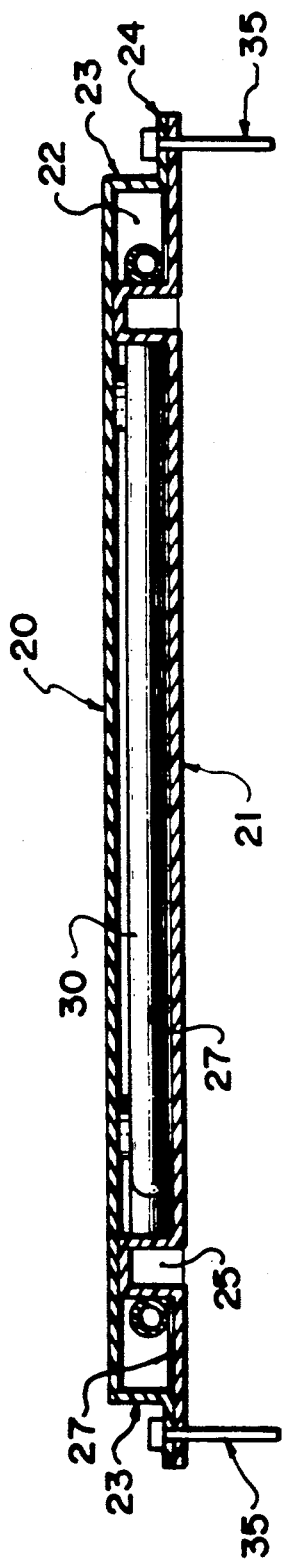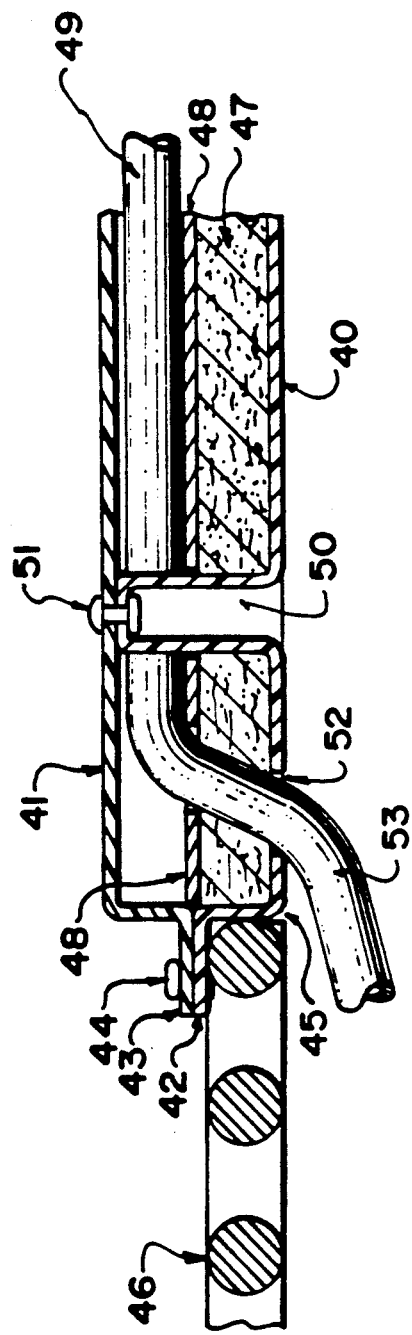

HEATING PAD

BACKGROUND OF THE INVENTION

This invention relates to a heating pad which is particularly but not exclusively designed for young animals, for example piglets in a farrowing crate.

Newborn piglets are very susceptible to drafts and cold and do not have sufficient control over their bodily temperature to survive without the presence of additional heating. It is of course uneconomic and undesirable for the sow to heat the whole barn to a temperature which is sufficient for the piglets and conventionally therefore separate heating is supplied to maintain the piglets at the required elevated temperatures.

Often the heating system involves the use of heat lamps which are supported just above the piglets. Heating lamps have a number of disadvantages in that they are prone to damage, have only a limited life and they require a relatively high level of power to provide the necessary heating effect.

Electrically heated pads have also been tried in the form of a flat sheet which is laid across the floor for the piglets to lie upon to obtain direct heat by contact with the pad. These pads are relatively expensive and are prone to premature failure. In addition electrical connections must be protected from the animals since an animal chewing the electrical leads could cause damage and could also become exposed to live wires. Such pads have therefore achieved only limited acceptability and are not popular. A further disadvantage is that in many cases they must be positioned in a corner in order for the electrical leads to be kept away from the animals and animals even from a young age tend to defecate in corners of the pen and hence a pad positioned in the corner often can become soiled and useless.

Other attempts to provide heating for animals have involved the attachment of hot water pies to the flooring generally underneath the flooring. This technique leads to arrangements which are difficult to clean and difficult to supply the necessary heated water. In one example, a steel plate is welded to a flooring section and water heating pipes welded to the underside of the late. This leads to a bulky, cumbersome system which is difficult to install and is limited to use with steel flooring.

SUMMARY OF THE INVENTION

It is one object of the present invention, therefore, to provide an improved heating pad which can, for example, be used for young animals which overcomes or alleviates some of the above disadvantages.

According to the invention, therefore, there is provided a heating pad for comprising an upper sheet, lower sheet substantially parallel to the upper sheet and spaced therefrom to define a shallow compartment therebetween and a supply pipe for heating liquid having an inlet and an outlet communicating from the compartment to the exterior and a plurality of convolutions of the pipe inside the compartment.

According to a second aspect of the invention there is provided a farrowing crate for a sow and piglets comprising a rectangular floor including a central perforated portion on which the sow can stand and lie and two side portions on which the piglets can stand and lie, at least one of the side portions including a heating pad on which the piglets can lie comprising an upper sheet, lower sheet substantially parallel to the upper sheet and spaced therefrom to define a shallow compartment therebetween and a supply pipe for heating liquid having an inlet and an outlet communicating from the compartment to the exterior and a plurality of convolutions of the pipe inside the compartment.

With the foregoing in view, and other advantages as will become apparent to those skilled in the art to which this invention relates as this specification proceeds, the invention is herein described by reference to the accompanying drawings forming a part hereof, which includes a description of the best mode known to the application and of the preferred typical embodiment of the principles of the present invention, in which:

DESCRIPTION OF THE DRAWINGS

FIG. 3 is a cross-sectional view along the lines 3—3 of FIG. 2;

FIG. 4 is a similar cross-sectional view showing an alternative embodiment.

In the drawings like characters of reference indicate corresponding parts in the different figures.

DETAILED DESCRIPTION

A hog farrowing crate conventionally includes a frame structure and a floor unit which are constructed over a flooring it so that the farrowing sow is maintained within the crate in a central portion of the crate while the piglets are free to move around the sides of the crate for suckling. The details of such farrowing crates are well known to one skilled in the art and the structure is shown only schematically in FIG. 1 in which the flooring only is shown including a central portion 10 on which the sow can stand and lie together with two side portions 11 and 12 basically for receiving the piglets which can run around the sow and access the sow from either side for suckling. The floor structure at the central area is different from the floor structure at the sides and these floor structures are shown only schematically since the details will be well known to one skilled in the art and various different types of flooring can be used.

Figure 2:
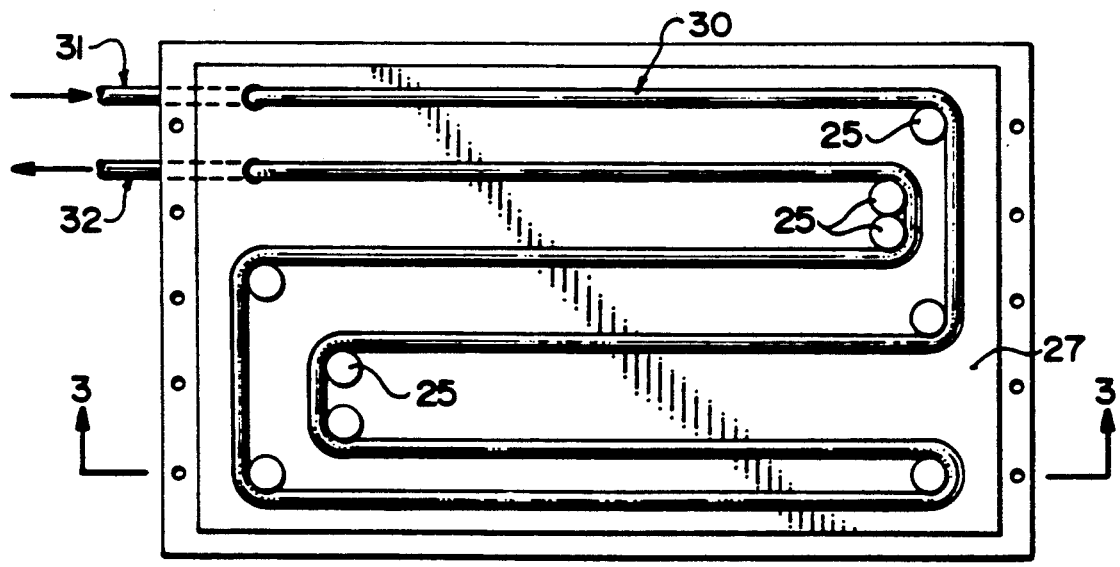
FIG. 2 is a plan view of the heating pad with the upper sheet removed showing the layout of the heating tube.

A heating pad 13 is positioned on the side portion of the flooring on one side of the centre section. The heating pad is shown in FIGS. 2 and 3. The heating pad is positioned centrally of one side so that it does not engage into one corner of the side portion of the crate. The crate is of course rectangular as shown with a length of approximately 6 feet so that the pad which can have dimensions of the order of 18 inches by 36 inches can lie along one side of the crate and has a length of approximately one half of the length of the crate.

The corners of the crate are often used by the piglets for defecating and hence the positioning of the pad centrally of the side tends to keep it in a clean condition.

Turning now to FIGS. 2 and 3, the pad comprises an upper sheet 20 and a lower sheet 21. Both sheets are substantially co-extensive so that the upper sheet lies directly on top of the lower sheet. The upper sheet includes depending sides 22 and depending ends 23 so as to enclose a compartment between the flat portion of the upper sheet and the lower sheet. The height of the compartment is of the order of ½ inch.

The upper portion includes a flange 24 projecting outwardly to the sides and ends with the flange overlying a portion of the lower sheet so that the flange can be attached to the lower sheet for example by pop rivets. The rivets can be countersank so that the underside is flush or flat for lying directly upon a flooring.

The lower sheet includes a plurality of upwardly projecting cylindrical shaped bodies 25 which extend the height of the compartment so that the upper surface of the cylindrical projection contacts the under side of the upper sheet and supports the upper sheet in the required spaced location.

Each of the upper and lower sheets can thus simply be formed by a vacuum forming technique from a single sheet of plastics material. The upper sheet can include an anti-slip pattern 26 either formed during the vacuum molding or formed previously on the sheet before the vacuum molding. On top of the lower sheet is a layer of a reflective foil 27 which acts to reflect radiated heat upwardly to reduce the amount of heat loss in the downward direction. Thus radiant heat tends to be transmitted through the upper surface and also convected heat tends to rise thus causing a majority of the heat to pass through the upper surface for heating the piglets.

Heat is supplied to the pad by a heating pipe 30 which extends from an inlet 31 to an outlet 32. Heated water at a temperature of the order of 120° F. can then be injected through the pipe to run through the convoluted path shown in FIG. 2 thus providing heat to the pad before the cooled liquid escapes through the outlet 32.

The projecting bodies 25 act as guides for the pipe so that in manufacture the pipe can be wrapped around the projecting portions to hold the pipe in position before the upper sheet is attached in place onto the lower sheet.

It will be noted that the inlet side of the pipe lies parallel to an outlet portion of the pipe throughout the length of the pipe within the heating pad thus spreading the application of heat throughout the pad without significant variations. The number of convolutions and the spacing between the pipes can vary depending upon the amount of heat to be applied to the pad and the size of the pad. One typical layout is shown in FIG. 2.

Figure 1:
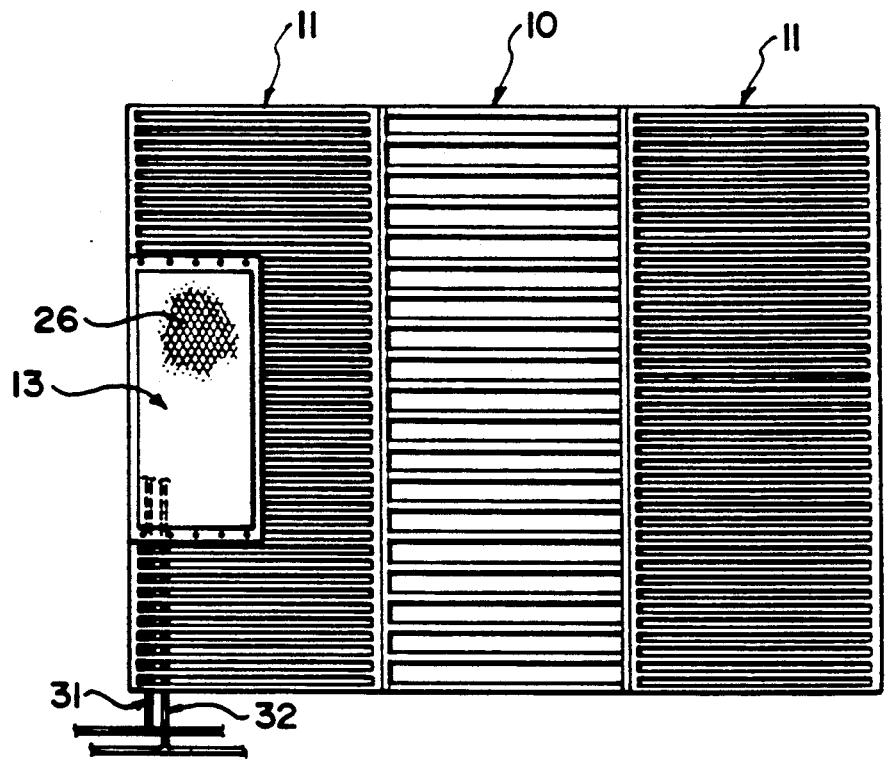
FIG. 1 is a top plan view of the floor portion of a hog farrowing crate.

The pipe is formed from a flexible hose of an elastomeric material of a type which is used for transmission of fluids in a corrosive environment. The hose is manufactured of a suitable material so it is resistant to acid and other corrosive action. The hose can thus pass from the pad underneath the flooring as shown in FIG. 1 without danger of the hose becoming rapidly corroded due to the harsh environment in the floor area. Such a hose is relatively flexible only one example has an outside diameter of ¼ inch and an inside diameter of the order of ⅛ inch. This hose has been found to provide sufficient liquid flow to transmit the necessary heat to the pad. A heat transfer from the pad of 120 watts is thought to be sufficient for a pad of the order of 18 inches by 36 inches.

The pipe for the pad can form part of a closed water supply system from a conventional heating source returning to the heating source for re-heating. A heat exchanger can be used if the hot water supply is at too high a temperature for direct transmission to the pads. A suitable circuit possibly including a manifold and filter system can be provided to ensure that the heat communication to the pads is substantially constant from one pad to the next.

When resting upon the floor, the pad having a thickness of the order of ½ inch is acceptable for the animal to climb onto the pad and to lie on the pad to gain the body temperature from the heated pad. The animals are of course inclined to lay on the pad rather than elsewhere in view of the fact that it is heated and thus more comfortable.

In order to locate the pad in place when resting on a perforated floor, the pad can include a plurality of pins 35 which project downwardly through the side flanges so that pins project into the flooring and prevent the pad from sliding from side to side. The pad can however be lifted for cleaning.

In FIG. 4 is shown an alternative arrangement which is modified relative to FIG. 3 in that the lower sheet 40 is recessed relative to a side flange 42. The upper sheet indicated at 41 includes a side flange 43 with the flanges being connected by a pop rivet 44. The recess thus formed in the lower sheet enables the lower sheet to be recessed into an opening 45 in the floor 46 so that a portion of the floor is omitted and the cost for that portion thus saved. The recess of the lower sheet into the floor locates the pad relative to the floor and enables the pad to be permanently fixed to the floor since it can be cleaned with the floor.

In addition the recess allows the introduction of a layer of insulation material 47 of a suitable type with the foil layer 48 resting on top of the insulation layer thus further reducing the transmission of heat in a downward direction.

The pipe is indicated at 49, a projection in the lower sheet is indicated at 50 and a pop rivet 51 connects the upper sheet to the projection.

An opening is cut in the lower sheet as indicated at 52 for exit of the pipes in a downward direction to provide a portion 53 which passes under the floor 46.

The provision of the insulation material makes the total pad thickness to be of the order of 1 inch in which case it is highly desirable for the pad to be recessed into the floor since the height of the pad would otherwise deter the animals from lying on the pad.

The projecting bodies 25 and 50 act to provide an additional support for the upper surface so that the pad cannot be simply compressed by the weight of an operator to cause damage.

In an alternative arrangement (not shown) a double unit is provided which can extend across from one crate to the next to provide an area for the piglets of both crates.

The use of the heating pad is not restricted to the raisin of young animals and a pad of the type defined can be used in other areas, for example childrens' playpens, greenhouses, and automobile floors.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. An animal containment pen comprising a floor on which the animal can stand and a heating pad for providing heat to an animal in the pen, the heating pad being loosely laid on top of the floor so as to be seperable therefrom, the heating pad comprising a substantially planar body having an upper substantially flat surface and a lower substantially flat surface for resting on the floor, and means within the body defining a continuous channel for passage therethrough of a heating liquid, the channel having inlet means connected to a source of heated liquid, outlet means connected to a drain for the liquid and a single continuous duct extending from the inlet means to the outlet means and means forming the duct into a convoluted path having a plurality of convolutions lying in a substantially common plane within the body, said body comprising a means defining a substantially planar upper sheet, means defining a substantially planar lower sheet parallel to the upper sheet and spaced therefrom to define a hollow interior therebetween within which said duct extends, the lower sheet being shaped to define a plurality of upwardly projecting support bodies, each support body comprising a top wall, arranged parallel to and in contact with the upper sheet to provide support therefor, and side walls means connecting the top wall and the lower sheet, the side wall means and the top wall being formed by deformation of a portion of the lower sheet upwardly from the plane of the lower sheet, said duct comprising a tube wrapped around at least some of the support bodies so as to be configured into the convoluted path by contact with the side wall means thereof.

2. The pen according to claim 1 wherein the upper sheet includes vertically depending sides arranged to close the edges of the compartment.

3. The pen according to claim 2 wherein the upper sheet and the lower sheet includes co-extensive flanges extending outwardly to sides thereof, the flanges lying in contact for connection of the upper sheet to the lower sheet.

4. The pen according to claim 1 wherein the duct comprises a flexible hose of an elastomeric material.

5. The pen according to claim 1 including a layer of insulation between the duct and the lower sheet 6. The pen according to claim 1 including a reflective foil material between the duct and the lower sheet.

* * * * *